Feb. 28, 1961 H. W. BARNETT ET AL 2,973,277
PROCESS FOR THE PRODUCTION OF SMOKED MEAT PRODUCTS
Filed Jan. 14, 1957 2 Sheets-Sheet 2
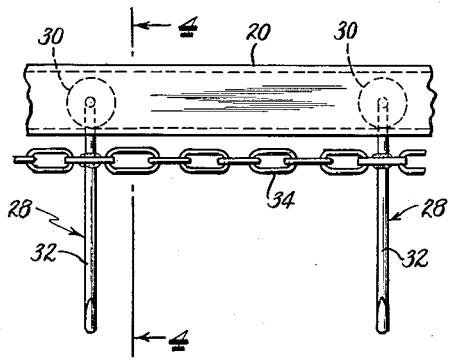
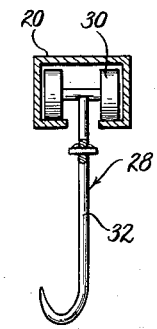
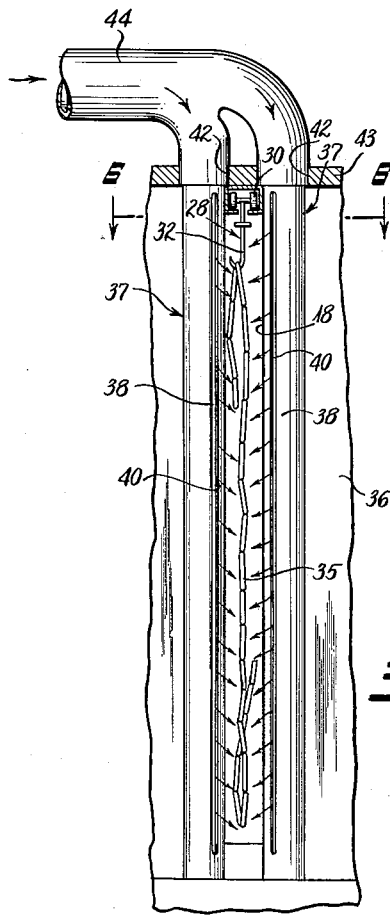
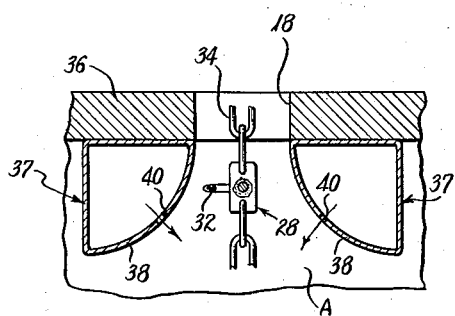
INVENTORS
Hugh W. Barnett
Leroy White
Henry Randolph Nordin
BY Bacon & Thomas
ATTORNEYS United States Patent Office 2,973,277
Patented Feb. 28, 1961

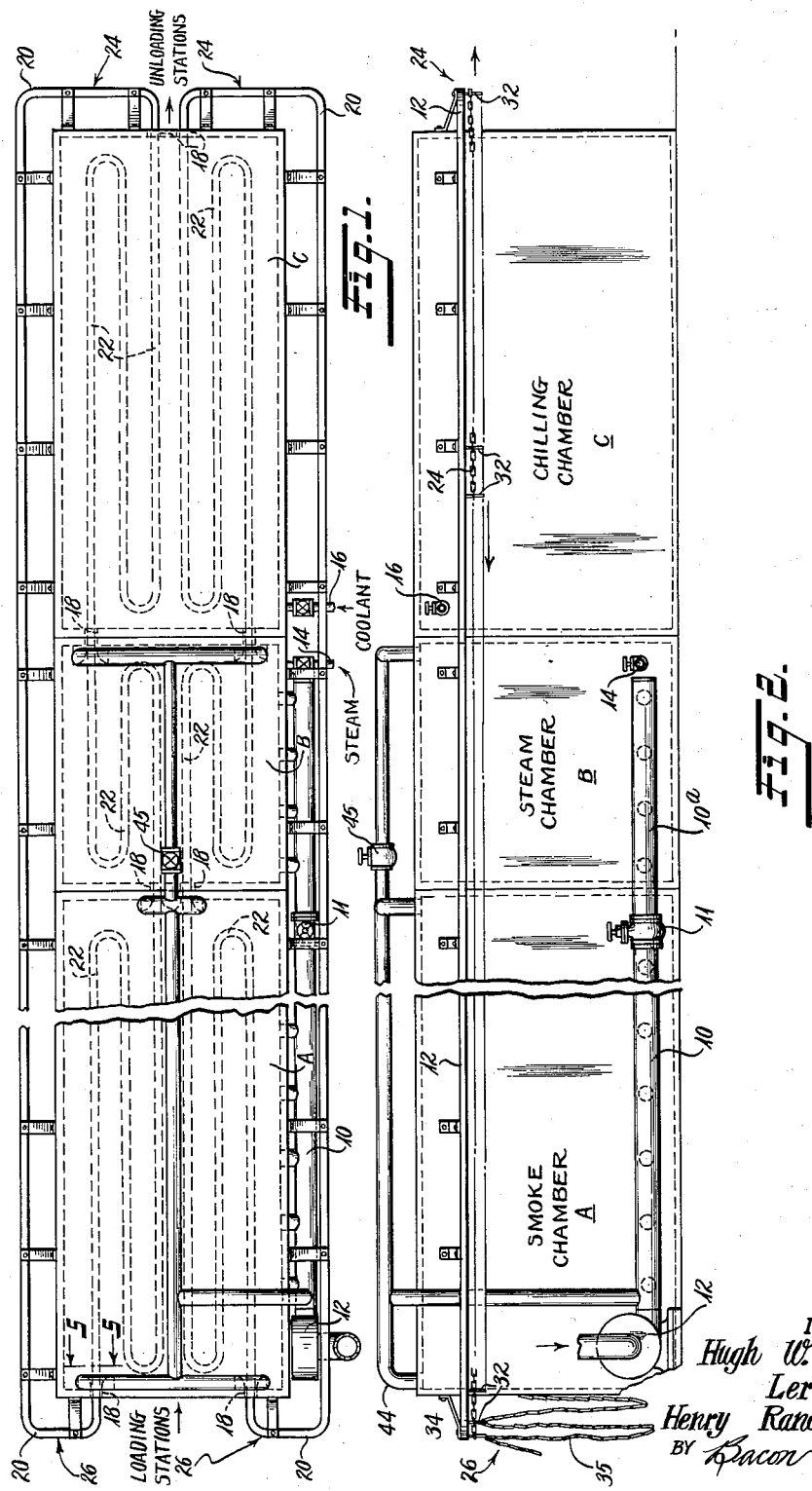

2,973,277

PROCESS FOR THE PRODUCTION OF SMOKED MEAT PRODUCTS

Hugh W. Barnett, Clarkson, Ontario, Leroy White, Toronto, Ontario, and Henry R. Nordin, Concord, Ontario, Canada, assignors to Canada Packers, Limited, Toronto, Ontario, Canada Filed Jan. 14, 1957, Ser. No. 634,006

7 Claims. (Cl. 99—229)

This invention relates to a process and apparatus for the production of smoked meat products, and particularly to the production of shaped, comminuted meat products such as sausages, bolognas, wieners, frankfurters, and the like.

The primary object of the invention is to provide a process for the rapid production of high quality smoked meat products.

Another object of the invention is to provide a process and apparatus for the rapid and continuous production of high quality smoked meat products with the minimum use of manual labor.

In the preparation of comminuted, smoked meat products of the type described, after shaping the product into the desired form three processing operations are normally separately applied; namely, smoking, steaming or hot-water cooking, and chilling. In the case of wieners, for example, the various ingredients comprising the mix are blended together and chopped into a smooth emulsion in a machine especially designed for this purpose. The emulsion is then stuffed or otherwise extruded into natural or artificial casings of various diameters. The resultant strand may then be manually or mechanically formed into links of any predetermined length by twisting and/or tying at regular intervals along the length of the strand. In the conventional batch processing operation, the linked wieners are then hung on sticks of wood, aluminum, or other material, by looping the linked strands around the sticks from end to end. Care must be taken to separate the loops sufficiently to prevent contact between individual wieners since this would result in unsmoked areas on the wiener surfaces. The main strand must be broken and tied off at the beginning and end of each stick. The loaded sticks are then transferred to special racks which support the sticks at either end, allowing the wieners to hang freely without contact with other wieners. When loaded, the racks are placed in smokehouses where smoke and heat are applied to develop the cure and produce the typical smoked meat flavor. The smoking time is generally at least 2½ hours, and in order to facilitate uniform smoking, the racks usually must be removed from the house and repositioned at intervals during such smoking operation. Usually, the temperature in the smokehouse is gradually and carefully increased as the smoking proceeds, with the maximum temperature being below about 170° F. Processes wherein the temperature of the smoke is maintained below about 170° F. are referred to herein as conventional smoking processes. The smoking operation is followed by a steaming or hot-water cooking operation, which in turn is followed by a chilling operation—normally under cold water sprays. The smoking, cooking and chilling operations may be performed in sequence within the smokehouse chamber, or the wiener racks may be transferred to separate chambers for cooking and chilling operations. At the completion of the processing operations, the sticks of wieners may be transferred from the processing racks to the packaging room. The wieners are there removed from the sticks, and the strands are separated into individual links. Wieners produced in natural casings are packaged directly. Wieners produced in artificial casing may or may not have the casing removed by mechanical or hand peelers prior to packaging.

It has heretofore been proposed to conduct such wiener processing operations in a continuous manner. However, the tremendously large size of the apparatus required to provide adequate plant capacity with this type of installation has constituted a serious problem. Even a product of small diameter such as wieners normally requires a total processing time in excess of three hours. This long processing period requires either an exceedingly long path of travel through the processing apparatus or a very slow rate of travel along a shorter path. In the first instance, apparatus units of large size would be required, and, in the second instance, a greater number of smaller units would be required, both amounting to a large installation of processing equipment. In addition, it has been the general belief in the industry that the ambient temperature must be gradually and carefully increased as the smoking proceeds. Provision of such gradual increase in a continuous system complicates the installation considerably.

Accordingly, it is a further object of the present invention to provide improved processing conditions whereby the smoking time and the over-all processing time are materially reduced, and the gradual increase in temperature during the smoking operation is rendered unnecessary, thereby enabling the processing to be conducted continuously in simple apparatus and an installation of practical size.

It has now been found that by treating the products with an atmosphere of dense smoke at a temperature much higher than previously thought possible, the rate of processing can be greatly accelerated without detriment to the product; in fact, the quality of the product can often be substantially improved by rapid processing under the conditions of the present invention. The process, in general, comprises contacting the meat products with an atmosphere of dense smoke at a temperature over about 200° F. for a period of time less than one-half that required in the conventional smoking processes, and then moving the smoked products through a chilling zone where they are rapidly cooled to packaging temperature. Where a processing time of approximately three hours for production of wieners was previously required, it has now become possible to process the product completely in less than about thirty minutes. Moreover, it has been found that such rapid processing substantially reduces the surface dehydration and results in desirable skin tenderness and low weight loss in processing. The temperatures employed in the fast process produce higher surface and internal temperatures in the product, thereby increasing its resistance to spoilage during subsequent storage. Accordingly, it is a further object of the invention to provide a process for producing smoked meat products of high quality and long storage life.

The high temperature process of the invention may be carried out in either batch or continuous fashion, the latter having the advantage of savings in manual labor, but both methods materially increasing the plant capacity due to much shorter processing time. The process is generally applicable to all types of meat products commonly stuffed into casings, either natural or synthetic, and then smoked, the casings either being removed to produce a so-called skinless product, or left intact. The process may also be used with whole meat pieces and with products placed in stockinettes, such as bone-in picnics, and the like.

A further important feature of the invention is the elimination of the steaming cycle at the end of the smoking operation in the processing of wieners and similar types of products. Steaming has been regarded as essential in wiener production for three reasons: (1) to facilitate removal of the outer casing at the time of packaging; (2) to tenderize the wiener skin; and (3) to equalize internal temperature. It has now been discovered that steaming is not necessary and in some respects a superior product can be prepared by eliminating this step. It appears that the high temperature process completes the smoking operation so quickly that no baking of the outer casing to the wiener occurs and skinning is readily accomplished without steaming. The high temperature process also minimizes surface dehydration (which produces a tough skin), and it has been found that subsequent tenderization by steaming is no longer necessary. Temperature uniformity in the forced-circulation, high-temperature house is so good that all of the product reaches essentially the same internal temperature, and steaming is therefore no longer required to equalize the internal temperatures. The elimination of the steaming operation has the advantages of providing a product with a better external color, better flavor, and with less fat and jelly separation. Steaming tends to bleach out some of the smoked color, and almost invariably removes some of the surface deposits which give the wiener some of its characteristic smoked flavor.

However, it should be understood that a steaming step may be included for products other than wieners, and may even in some instances be included in wiener processing, if desired. In either case, the over-all processing time is materially reduced, the high-temperature smoking operation generally reducing the length of the steaming required.

Another object of the invention is to provide improved apparatus for the continuous processing of meat products. The apparatus, in general, comprises successive smoking, steaming, and chilling chambers with a continuous conveyor system moving through such chambers. Optionally, the cooking chamber may be eliminated for wiener processing or may be used as an additional smoking chamber. Because of the greatly reduced processing time and the lack of necessity of providing for gradually increasing ambient temperature, the production unit is compact, simple in design, and occupies less than one-third the space previously required for batch operation. In addition, the continuous system permits the use of endless chains or belts, eliminates sticks or racks and the storage and washing problems associated with both. Another feature of the apparatus of the invention is the provision of novel means for minimizing loss of smoke around the entrance and exit openings of the smoke chamber.

In accordance with this facet of the invention, linked strands of wieners or the like can be fed into the processing system as a continuous string, eliminating the breaking and tying operation required for stick loading. This not only results in labor saving, but provides a considerable saving in product material, since the end product of each stick in the batch process tends to shrivel, and must often be discarded. The linked strands of wieners are conveyed continuously through the successive smoking, steaming (optional), and chilling zones, entering the system through a narrow opening in the wall of the smoking chamber, passing through such chamber, through a similar opening in the opposite wall of the chamber, if desired, through a chamber equipped with steam jets constituting the steaming zone, then through a chamber equipped with cold water sprays, chilling coils, or the like, constituting the chilling zone. Unprocessed wieners enter the system at one end while processed wieners on the same strand emerge at the other end. In the smoking zone the wieners are subjected directly to an atmosphere of dense smoke at a temperature above about 200° F., and preferably within the range of about 225 to 260° F. The rate of travel of the wieners through the smoking zone is so correlated with the length of the path of travel through such zone that the wieners remain in the smoking zone for a period of time of less than about one-half hour, and preferably for a period of time within the range of approximately 10 to 30 minutes. Where a subsequent steaming operation is employed, the residence time in the smoking chamber may be slightly less than where steaming is eliminated. A smoking time of 10 to 15 minutes is adequate for such operation. The rate of travel in the steaming zone is so correlated with the length of the path of travel that the wieners remain in such cooking zone for a relatively short period of time, less than about 15 minutes, and usually no longer than approximately 5 to 10 minutes. The temperature maintained in the steaming zone is advantageously in the range of from about 150° to 180° F. The internal temperature of the product during the smoking, or smoking and steaming operations should reach at least about 150° F., the time of processing being adjusted accordingly. Conditions in the chilling zone are adjusted so that the products are chilled to a packaging temperature, below say 60° F., within approximately 10 minutes. Most products may be readily chilled to such temperature within about 5 to 10 minutes, but longer chilling periods may be used if desired.

The continuous process and apparatus will be further understood by reference to the accompanying drawings in which:

Fig. 1 is a diagrammatic top plan view of apparatus for the continuous processing of the meat products, showing successive smoking, steaming, and chilling chambers, with a double, continuous conveyor system extending therethrough;

Fig. 2 is a diagrammatic side elevation of Fig. 1;

Fig. 3 is an enlarged, fragmentary side view showing a pair of successive meat-hanging hooks joined by a conveyor chain;

Fig. 4 is a sectional view taken on the line 4—4 of Fig. 3.

Fig. 5 is a fragmentary, sectional view taken on the line 5—5 of Fig. 1, and showing the inside of the inlet end of the smoke chamber and the means for minimizing issuance of smoke through the inlet opening; and Fig. 6 is a sectional view taken on the line 6—6 of Fig. 5.

Referring now to the drawings in detail, and particularly to Fig. 1 thereof, there is shown, in succession, a smoking chamber A, a steaming chamber B, and a chilling chamber C. The smoking chamber A may be provided with a smoke-manifold 10 for introducing smoke from a fan 12 connected to conventional smoke-producing apparatus (not shown). Exhaust ducts and fans (not shown) for withdrawing smoke from the chamber A and for recirculating such smoke may also be provided. The steaming chamber B is provided with a steam line 14 connected to a source of steam and to a number of steam jets (not shown) within the chamber B for maintaining the cooking temperature at the desired level. The chilling chamber C is provided with an inlet pipe 16 connected to a source of cold water and to spray means (not shown) within the chamber C for directing a series of cooling sprays upon the product passing therethrough.

In accordance with the invention, the entrance and exit ends of each of the chambers A, B, and C are provided with elongated, vertical slots 18 for permitting passage of the meat products to be processed into and out of the respective chambers. The configuration of the slots 18 is best seen in Figs. 5 and 6. A plurality of such slots 18 may be provided at each end of each chamber, two being shown in the embodiment illustrated. A pair of continuous rails 20 extend through the slots 18, and are secured near the top of each of the respective chambers A, B, and C. Wider chambers and additional slots and rails may be provided if desired. The rails 20 follow a tortuous path defining several loops 22 back and forth through each of the chambers, thereby providing a sufficient path of travel to permit the product to remain in its respective chamber for the desired processing time. The lengths of the respective chambers and path defined by the rails in such chambers are correlated with respect to the processing time for operation in the respective chamber. The rails 20, after leaving the chilling chamber C, may pass by an unloading station generally indicated at 24, and then return past a loading station generally indicated at 26 at the forward end of the smoking chamber A.

The rails 20 carry a plurality of meat-hanging devices 28, each comprising, as shown in detail in Figs. 3 and 4, trolleys 30 from which a hook 32 is suspended. The trolleys 30 and hooks 32 are joined by means of a chain 34 so that they may be moved together in a train in a closed circuit following the endless rails 20 of the conveyor system. The chains 34 also maintain the hooks 32 at a proper spaced relation, and are associated with drive means (not shown) for moving the assembly continuously around the endless rails 20 at a desired rate of speed.

As shown in Fig. 2, the meat products 35, such as strands of weiners or the like, may be looped successively on the hooks 32 at the loading station 26—by either manual or automatic means (not shown), so that they extend vertically downwardly for substantially the entire depth of the treating chambers A, B, and C. The sticks or racks employed with the other processes are not necessary.

An important feature of the apparatus is the provision of means for minimizing issuance of smoke from the entrance and exit slots in the smoking chamber A. Such means are illustrated in Figs. 5 and 6, wherein a portion of the inside forward wall 36 of the chamber A containing the entrance slot 18 is illustrated. A smoke duct 37 is vertically disposed on each side of the slots 18 along the inner face of the wall 36. These ducts 37 have an arcuate surface 38 extending inwardly and away from the slot 18. In such arcuate surface 38 is a narrow vertical slot 40 extending for the entire distance of the slot 18. The top of the ducts 37 are connected through openings 42 in the top wall 43 of the smoke chamber A to a manifold 44 which is connected to the pressure side of the fan 12 delivering smoke to the smoke chamber. Accordingly, during operation of the process, smoke is directed inwardly in the direction of the arrows shown in Figs. 5 and 6 at an angle of about 45 degrees on each side of the entering products 35 and along the entire length of the slot 18, thereby forming an inwardly-directed moving curtain tending to prevent smoke from issuing from the slots 18. By this means, the meat products 35, as they enter the chamber, are immediately contacted with a stream of high temperature, dense smoke, to which they are subjected throughout their residence time in the smoke chamber. A similar means is provided at the exit end of the smoke chamber A along the exit slot 18. Since it is desirable that steam should not enter the smoking chamber, the pressure in the smoking chamber may be maintained at atmospheric pressure or slightly above atmospheric, while the pressure in the steam chamber is maintained no higher than atmospheric pressure.

In operation, the products 35, after being looped on the hooks 32, move in a continuous manner throughout the smoking, cooking, and chilling operations, and each of the loops of meat products is subjected to exactly the same conditions as every other loop, as such loops pass through the respective chambers. The resulting products accordingly are of very uniform quality, since all such products are subjected to whatever temperature and humidity variables may be present in different locations within the chambers. No difficulty is encountered, as in the batch process, with products located in hot spots being overprocessed, while products located in cold spots are underprocessed. It will be understood that the conveyor speed, exact temperature of the smoking chamber, temperature of the steamer, etc., will be determined to some extent by the size of the product conveyed. The smaller the diameter of the meat product, the faster may be the conveyor speed. Likewise, the faster the speed or the larger the diameter of the product, the higher the smoking, and steaming temperatures required. However, for all types of products contemplated, the smoking temperature in chamber A should be at least above 200° F. The provision of the double conveyor system throughout the smoking, cooking, and chilling units permits different speeds to be utilized, so that smaller diameter meat products may be placed on the faster-moving conveyor, and larger diameter meat products placed on the slower conveyor. Additional conveyors permit a wide variety of products to be processed simultaneously in the same chambers.

For weiner processing, the chamber B can be completely eliminated, the smoking chamber A being followed directly by the chilling chamber C. Optionally, smoke may be introduced into the chamber B from fan 12 through manifold 10a by opening damper 11. The steam in this instance is eliminated by closing the valve in steam line 14. A smoke-closure means as previously described may be provided at the exit end of chamber B and may be placed in operation by opening damper 45 in smoke line 44.

In preparing a weiner emulsion prior to processing, it is advantageous to incorporate a small amount of ascorbic acid to facilitate rapid curing and the more rapid development of the characteristic cured pink color inside the weiner.

The invention is further illustrated by the following examples of practice:

EXAMPLE I

*Batch operation, high temperature process with and without steaming*

One batch of weiner emulsion was stuffed into casings, linked and the linked weiners divided into two lots.

The first lot was placed in a high-temperature smoke chamber and smoked for 20 minutes at 240° F. The internal temperature of the weiners rose to 155° F. during this time. The weiners were then steamed for 10 minutes at 165° F., then showered for 5 minutes with cold water. The processing shrink was 4.8 percent. Color, flavor, and peelability were all good, but a slight separation of fat occurred.

The second lot was then placed in the same chamber and smoked for 25 minutes at 240° F., to an internal temperature of 162° F. The weiners were then showered with cold water for 7 minutes. The processing shrink was 5.2 percent. Color and flavor were excellent, peelability the same as with the steamed weiners, and there was no visible separation of fat.

Bacteria counts were made on weiners with and without steaming. There were no significant differences.

EXAMPLE II

*Conventional and high temperature continuous operation*

A batch of standard wiener emulsion was stuffed into a casing and linked in a linking machine. One-half the batch was processed by the conventional batch method. Thus, this portion of the batch, after linking, was hung on sticks, breaking and tying at the beginning and end of each stick. The sticks were then transferred to racks, which were pushed into a batch smokehouse held at a temperature of 135° F. The temperature in the house was gradually increased, over a period of 30 minutes, to 160° F. After approximately 1 hour at 160° F., the racks were removed from the house, turned around, and repositioned in the house. After a total smoking time of approximately 2¾ hours, the racks were removed and transferred to a steamer. The wieners were steamed at 165° F. for 12 minutes, then chilled under cold water sprays for 5 minutes. The sticks of wieners were then removed from the racks, transferred to trucks, and delivered to the packaging room.

The second half of the batch after linking was fed directly into a smoking chamber adapted for continuous processing in accordance with the process of the present invention. The temperature in the chamber was maintained at 240° F., with an atmosphere of dense smoke. The conveyor speed was regulated to give 13 minutes in the smoking chamber, 6½ minutes in the steaming chamber, and 5½ minutes in the chilling chamber. The temperature in the steaming chamber was 170° F. and in the chilling chamber 50° F. Twenty-five minutes after first entering the system, wieners ready for packaging began to emerge.

The wieners processed in the conventional batch operation showed a loss in weight of 9.5 percent of the fresh weight during processing. The meat skin under the casing was quite tough, due to surface dehydration during smoking. A considerable expenditure of manual labor was needed to meet production requirements.

The wieners processed in the continuous operation showed a loss in weight on processing of only 4.5 percent. The meat skin under the casing was very tender. The entire production requirement was met with a labor expenditure of substantially less than half that required by the batch process.

It will be understood that the continuous process as described in Example II above may be very advantageously carried out without the steaming step, the time in the smoke chamber being adjusted, if necessary, to permit the internal temperature of the product to reach at least about 150° F. The time, for example, may be increased to about 20 to 25 minutes. If desired, smoke at 240° F. instead of steam may be introduced into the steaming chamber described in the continuous process in Example II, the residence time in this chamber being substantially the same as with the steaming operation.

EXAMPLE III

*Shelf-life conventional and high-temperature products*

Eight-ounce cello packages of wieners prepared by the conventional batch process and by the continuous high-temperature process as described in Example II were stored at 45° F. for shelf-life study. Duplicate samples of each type were selected at 0, 13, 16, and 20 days of storage, for bacteria count and organoleptic evaluation. Total viable aerobic count was determined by aseptically removing 20 grams of cross-sections of all wieners in the package, grinding in an "Osterizer" blender (a Waring-type blender) with physiological saline and preparing suitable dilutions on T.G.E. (trypton glucose extract) agar. Duplicate plates were incubated at 45° F. for 7 days, and at 80° F. for three days. The organoleptic evaluation was measured by changes in taste, color, and odor. The bacteria counts and organoleptic changes were as presented in the following table:

TABLE 1.—BACTERIA COUNTS AND ORGANOLEPTIC CHANGES IN WIENERS

| No. Days | Continuous Process | | | Conventional Process | | |
|---|---|---|---|---|---|---|
| | Bact./Gram | | Organoleptic | Bact./Gram | | Organoleptic |
| | 45° F. | 80° F. | | 45° F. | 80° F. | |
| 0 | 600 / 100 | 180 / 200 | Good | 500 / 300 | 210 / 180 | Good. |
| 13 | 12,000 / 8,200 | 5,000 | No Change | 18,000 / 13,000 | 12,000 | No Change. |
| 16 | 95,000 / 140,000 | 40,000 / 20,000 | ----do------ | 174,000 / 217,000 | 65,000 / 48,000 | Do. |
| 20 | 110,000 / 120,000 | 159,000 / 170,000 | Good Color, Odor, and Taste. | 140,000 / 100,000 | 200,000 / 310,000 | Good Color, Odor, and Taste. |

The two figures given in each square in the foregoing table represent test results of the duplicate samples.

From the foregoing table, it will be observed that the bacteria counts were consistently lower with the continuous-process wieners. With both types of processing, the wieners were still of good color, odor, and flavor at twenty days of storage, and the bacteria count was well below that of the spoilage level (10 million/gram).

The principle of high-temperature smoking may also be extended to other meat products than small sausage or wiener-like comminuted meat products. Thus, picnics, hams, cottage rolls, etc., may also be subjected to high-temperature smoking—either on a batch or continuous basis. The same type of continuous smoke chamber and conveyor system may be used with these products as has been previously described for use with wieners, the method of hanging being modified slightly since these products are adapted to be hung as single units rather than in strands. Steaming and chilling operations are generally not required for this type of meat product. Since the processing time required for larger products, such as hams, picnics and other whole meat pieces, even at high temperatures, is much longer than for wieners, the path of conveyor travel in the continuous smoke chamber is necessarily much longer, or the conveyor speed much slower. For such meat products, the time in the high-temperature smoke should be such as to bring the internal temperature to a minimum in the range of from about 148° F. to 160° F., or higher for ready-to-serve products, and to a minimum internal temperature of about 138° F. for regular products. With a continuous type installation adapted primarily for wieners and the like, it is possible with a conveyor speed of 2" per minute, and with a smoke chamber temperature of about 200° F., to produce 360 pounds of picnics per hour by hanging these products 4 deep on the conveyors, i.e. one above the other. The savings in labor afforded by continuous processing of the larger products is substantial, as is the case with processing of the smaller products such as wieners. The following examples are illustrative of high-temperature smoking of larger types of meat products:

EXAMPLE IV

*Conventional and high-temperature smoking of hams*

A lot of hams which had been cured in the conventional manner was divided into two groups and boned and stuffed into Visking casings. One group was smoked in a conventional smoke chamber at a temperature gradually increasing from 120° F. to 180° F. to an internal temperature of 158° F. The other group was smoked in a high temperature chamber (200° F.) with a relative humidity of 40% to the same internal temperature.

The conventional procedure required 16 hours and gave a processing shrink of 9.5%.

The high temperature smoking required only 6 hours and gave a smoking shrink of 6.2%.

Both these products were presented to large panels for extensive organoleptic tests. The panels showed that there was no difference with respect to flavor, texture, wetness, or appearance between the two groups.

Extensive keeping time tests with respect to both retention of color and rate of development of bacteria again showed no difference between the two methods of processing.

EXAMPLE V

*Conventional and high-temperature smoking of picnics*

In another test on picnics, one lot of cured picnics was divided into two groups, boned and stuffed into Visking casings.

One group was processed in the conventional manner by smoking in a chamber whose temperature was gradually increased from 120° F. to 170° F. and maintained there until the internal temperature of the picnics reached 138° F. The other group was smoked at a chamber temperature of 200° F. and a relative humidity of 40% to the same internal temperature.

The time required to smoke picnics in the conventional manner was 12 hours and gave a shrink of 10.9%.

The accelerated smoking procedure required only 3½ hours and gave a smoke shrink of 6.9%.

These picnics were then cooled and paneled by a large group of experts in this field. They were unable to determine any difference in organoleptic quality between the two groups.

Extensive keeping time tests as in the case of hams showed no difference with respect to color retention or rate of spoilage.

Numerous tests have been conducted on other products, cottage rolls, bone-in picnics, etc., and have given similar results at various humidity and high temperature conditions. The higher the temperature, of course, the shorter the smoking time will be.

In general, a smoking time of less than about six hours is adequate for all types of products.

Although Examples IV and V cover tests conducted in batch fashion in a conventional smoke chamber, the processing time required was so drastically reduced that continuous processing is now made feasible. The speed of the conveyors and the temperature of the chamber are so adjusted that the product emerges at the desired internal temperature.

We claim:

1. A continuous process for the production of smoked sausage products, comprising: moving small, unsmoked sausage products along a continuous path through a smoking zone while subjecting them to an atmosphere of dense smoke at a temperature between about 200° F. and about 260° F., maintaining said meat products in contact with said atmosphere of dense smoke for a period of time less than about one-half hour and raising the internal temperature of said products to at least about 150° F., and then moving said meat products along said continuous path through a chilling zone to cool said meat products to packaging temperature.

2. The process of claim 1 wherein said sausage products are wieners, and said wieners are moved through the atmosphere of dense smoke at such a rate that they reach an internal temperature of at least 150° F. and are then moved directly into the chilling zone without steaming.

3. The process of claim 1 wherein said sausage products are wieners and said wieners are continuously moved through a steaming zone between said smoking and chilling zones.

4. A continuous process for the production of wieners, comprising: moving linked strands of unsmoked wieners along a continuous path through a smoking zone and a chilling zone; subjecting said wieners while passing through said smoking zone to an atmosphere of dense smoke at a temperature of about 225° F. to 260° F. for a period of time not in excess of about thirty minutes but sufficient to raise the internal temperature of said wieners to at least about 150° F.; and chilling the smoked wieners while passing through said chilling zone to a temperature below about 60° F.

5. A continuous process for production of smoked sausage products, comprising: continuously feeding linked strands of comminuted and cased, unsmoked sausage products in a series of successive loops through a smoking zone, a steaming zone, and a chilling zone; adjusting the speed of movement of said products with respect to the path of travel through said zones so as to maintain said products in said smoking zone for a period of time of approximately ten to fifteen minutes, in said steaming zone for a period of time of approximately five to ten minutes, and in said chilling zone for less than approximately ten minutes; maintaining an atmosphere of dense smoke in said smoking zone at a temperature in the range of from about 200° F. to 260° F.; maintaining a temperature of from about 150° F. to 180° F. in said steaming zone, the residence time of said products in said smoking and steaming zones being sufficient to raise the internal temperature of said products to at least about 150° F.; and showering said products with cold water in said chilling zone.

6. A process for the production of wiener products comprising: heating unprocessed wieners for a period of time of less than about 30 minutes but sufficient to raise the internal temperature of said products to a minimum of about 150° F. and during at least an initial portion of said heating period subjecting said wieners to the action of dense smoke at a substantially uniform temperature at a range of about 200° F. to 260° F.

7. A continuous process for the production of smoked whole meat products comprising: moving unsmoked meat products along a continuous path through a smoking zone while subjecting them to an atmosphere of dense smoke at a substantially uniform temperature in a range of from about 200° F. to 260° F. and at a relative humidity of about 40% for less than about six hours and at such a rate that they reach an internal temperature of at least about 138° F., said six-hour period being the maximum cooking time for said products.

References Cited in the file of this patent

UNITED STATES PATENTS

| | | |
|---|---|---|
| 1,402,204 | Alsop | Jan. 3, 1922 |
| 1,984,435 | Seaver | Dec. 18, 1934 |
| 2,137,898 | McKee | Nov. 22, 1938 |
| 2,140,163 | McKee | Dec. 13, 1938 |
| 2,266,131 | Thon | Dec. 16, 1941 |
| 2,342,373 | Schiewe | Feb. 22, 1944 |
| 2,565,454 | MacKenzie et al. | Aug. 21, 1951 |
| 2,585,799 | Lawrence | Feb. 12, 1952 |
| 2,641,544 | Parker | June 9, 1953 |
| 2,789,914 | Davis | Apr. 23, 1957 |
| 2,844,478 | Hanley et al. | July 22, 1958 |